United States Patent [19]
Lee

[11] Patent Number: 5,838,414
[45] Date of Patent: Nov. 17, 1998

[54] LCD DEVICE WITH IMPROVED RESILIENT ADHESIVE SPACERS

[75] Inventor: Sangrok Lee, Kyungki-do, Rep. of Korea

[73] Assignee: Samsung Display Devices Co., Ltd., Kyungki-do, Japan

[21] Appl. No.: 734,885

[22] Filed: Oct. 22, 1996

[30] Foreign Application Priority Data

Dec. 30, 1995 [KR] Rep. of Korea ............... 95-68206

[51] Int. Cl.⁶ ............................................ G02F 1/1339
[52] U.S. Cl. ................................... 349/157; 349/156
[58] Field of Search ............................ 349/155, 156, 349/157

[56] References Cited

U.S. PATENT DOCUMENTS

| | | | |
|---|---|---|---|
| 4,720,173 | 1/1988 | Okada et al. | 349/155 |
| 4,763,995 | 8/1988 | Katagiri et al. | 349/156 |
| 4,775,225 | 10/1988 | Tsuboyama et al. | 349/155 |
| 4,983,429 | 1/1991 | Takayanagi et al. | 428/1 |
| 5,142,395 | 8/1992 | Yamazaki et al. | 349/157 |
| 5,206,751 | 4/1993 | Escher et al. | 349/172 |
| 5,220,446 | 6/1993 | Rho | 349/155 |
| 5,285,304 | 2/1994 | Hotta et al. | 349/157 |
| 5,459,598 | 10/1995 | Carrington | 349/155 |
| 5,515,191 | 5/1996 | Swirbel | 349/155 |

FOREIGN PATENT DOCUMENTS

| | | |
|---|---|---|
| 0314048 | 5/1989 | European Pat. Off. . |
| 60-98421 | 6/1985 | Japan . |
| 63-110425 | 5/1988 | Japan . |

OTHER PUBLICATIONS

Patent Abstract of Japan, JP 07–168161, Wada, "Liquid Crystal Display Device", Jul. 1995.

*Primary Examiner*—William L. Sikes
*Assistant Examiner*—Toan Ton
*Attorney, Agent, or Firm*—Christie, Parker & Hale, LLP

[57] ABSTRACT

A liquid crystal display device having a pair of substrate assemblies and a pattern of electrodes that define active and inactive areas of the display. Spacer elements are disposed only in inactive areas of the display to maintain a uniform predetermined cell gap between the substrate assemblies for the liquid crystal material. Some of the spacers are adhesive to provide shock resistance for the device.

13 Claims, 3 Drawing Sheets

LCD DEVICE WITH IMPROVED RESILIENT ADHESIVE SPACERS

FIELD OF THE INVENTION

The present invention relates to liquid crystal display devices and, more particularly, to an improved technique for precisely maintaining the distance between substrates of a liquid crystal display cell.

BACKGROUND

A liquid crystal display device typically includes a pair of substrates which are maintained in a spaced apart, yet parallel relationship with one another. The space between the substrates is commonly referred to as the cell gap. Interposed between the substrates, within the cell gap, is a liquid crystal material which changes its optical characteristics in response to an applied electrical signal.

A plurality of electrodes are disposed upon the inner surface of the substrates in order to control and apply the desired electrical signals to the liquid crystal material. Some LCD devices will have an electrode arrangement which allows a predetermined set of characters or symbols to be generated, while other LCD devices have a matrix of electrodes that form a display comprised of a great plurality of individually accessible pixel elements, each of which may be selectively activated to form an infinite variety of images.

Due to the electro-optical characteristics inherent the liquid crystal material, it will typically assume one state when no electrical signal is applied and will assume another, different state when an electrical signal is applied. For example, some liquid crystal materials will assume a reflective state when no electrical signal is applied, and will assume a transmissive state under the influence of an applied electrical signal. Some new liquid crystal materials provide performance with a variety of different gray levels as well.

In order to assure the proper operation of a liquid crystal display device, it is critical that the cell gap be precisely and uniformly maintained throughout the entire display. Even slight deviations in the cell gap is will result in a noticeable and defective appearance in the display. This can readily be seen with a conventional LCD display panel when even slight pressure is applied by a fingertip. In response to the pressure, the cell gap in the affected area will be reduced slightly, resulting a dark spot, degradation of contrast or other undesirable defect in the displayed image.

In a conventional LCD device, the cell gap is maintained by providing a plurality of spacers between the substrates. The spacers, which are of a uniform height, are usually randomly disposed within the cell gap, such as by a spraying technique. This results in an uneven distribution of spacers with a greater concentration of spacers in some areas of the display and very few spacers in other areas. To ensure that an adequate concentration of spacers to maintain the proper cell gap are disposed in all areas of the display, an over-distribution of spacers must be used. In other words, in order to ensure that the less densely populated areas have sufficient spacer support, the more densely populated areas will have an over-abundance of spacers.

In addition, according to such conventional techniques for placement of the spacers, they are placed in both "inactive" and "active" areas of the display. The "active" areas are those areas of the liquid crystal material which may be selectively activated because they are located between opposed electrodes disposed upon the substrates. The "inactive" areas are those areas of the liquid crystal material that cannot be selectively activated because of the absence of opposed electrodes on the substrates. Typically, the inactive areas of the display will includes other elements such as a black matrix to improve the performance of the display.

Inherent in such conventional spacer techniques are several undesirable deficiencies in the structure and performance of the liquid crystal display panel. Spacers which are disposed in the active display areas cause defects, such as the degradation of contrast or the undesirable emission of light around the edges of the spacers in the active display areas. Further, according to conventional techniques, an over-abundance of spacers, particularly in active display areas, will further degrade contrast of such affected areas.

In the field of ferroelectric liquid crystal display devices, problems caused by conventional spacer techniques are more serious. The cell gap of a typical ferroelectric liquid crystal display device is roughly about 1.5 $\mu$m as compared to a conventional liquid crystal display device where the cell gap is typically about 6 to 7 $\mu$m. Thus, the tolerances of the ferroelectric liquid crystal display device must be more exact. Further due to the much smaller cell gap as well as the desire to increase the overall display area to provide larger displays, the ferroelectric liquid crystal display device tends to be much more fragile than the thicker conventional LCD device. However, other advantages of the FLCD device, such as an extremely fast response time which allows larger and higher resolution displays, make it desirable as a display technology of the future. A serious manufacturing and durability problem with FLCD devices is a tendency to easily fracture from impact, either during manufacturing or during use in a wide variety of applications.

U.S. Pat. No. 5,459,598 to Carrington proposes various spacer designs for a ferroelectric liquid crystal display device. As seen in FIG. 2 of Carrington, a plurality of substantially square spacer members 10 are arranged with small spaces 12 between and form walls 13. FIG. 4 illustrates an alternative arrangement where each of the spacer members 10 has an associated auxiliary wall that extends less than the length of the cell gap, providing a gap 15 and a cavity 17. Carrington also discloses a sticky spacer 18 disposed between the spacer walls 10, for enhancing the mechanical strength of the construction. As seen from FIG. 1, the "active' areas of the Carrington display device are those areas between the spacer walls 10, which may be selectively activated by electrodes 4. Thus, the design proposed by Carrington involves disposing the sticky spacer 18 directly in an active area of the display device, resulting in deficiencies similar to those of conventional LCD devices which dispose spacers in active areas of the display.

SUMMARY OF THE INVENTION

In view of the foregoing, it is an object of the present invention to provide an improved LCD device construction with spacers that are disposed so as to minimize interference in active areas of the display, resulting in an improvement in the quality of the performance of the display device.

It is another object of the present invention to provide an improved LCD device construction which enhances the mechanical strength and durability of the device, and which is particularly suited for the exacting tolerances required by an FLCD device.

It is a related object of the present invention to provide a technique for manufacturing an LCD device with such an improved construction.

The above objects are realized in accordance with the present invention which provides an LCD device with spacers that are disposed substantially only in inactive areas of the display. Thus, the cell gap is precisely maintained by spacers disposed in inactive areas, and the active areas of the display are substantially free of spacers which interfere with the performance of the device.

According to a preferred embodiment of the invention, the spacer elements will include adhesive spacer elements disposed in inactive areas of the display. The adhesive spacer elements are resilient and allow a degree of movement between the substrates in the case of shock or the application of pressure. Under normal conditions, the adhesive spacer elements will ensure that the desired cell gap is precisely maintained. Thus, the adhesive spacers enhance the durability and mechanical integrity of the LCD device. This is particularly important and useful in the case of FLCD devices, which tend to be much more fragile and require more exacting tolerances.

BRIEF DESCRIPTION OF THE DRAWINGS

The foregoing and other objects and advantages of the present invention will be better understood from the following detailed description when viewed in conjunction with the attached drawings, in which.

While the invention will now be described and illustrated in connection with certain preferred embodiments, it should be understood that it is not intended to limit the invention to those particular embodiments and examples. On the contrary, it is intended to cover all alternatives, modifications and equivalents falling within the spirit and scope of the invention as defined by the appended claims.

DETAILED DESCRIPTION OF THE INVENTION

Figure 1:
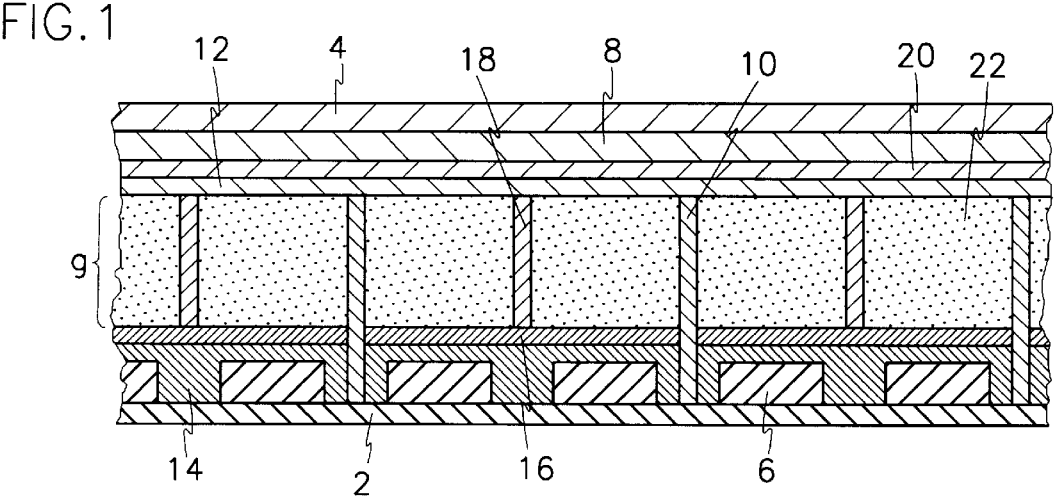
FIG. 1 is a side cross-sectional view of a liquid crystal display device of the present invention.

Referring first to FIG. 1, there is shown a side cross-sectional view of a liquid crystal display device according to a preferred embodiment of the invention. The device includes a lower substrate 2 and an upper substrate 4 which are typically formed of glass, but may also be formed from other materials such as plastic. As can be seen, the substrates 2 and 4 are generally flat and planar and provide support for the various elements of the device.

An array of electrodes is disposed upon the surface of each of the glass substrates. By way of example, the illustrated embodiment of the invention is a matrix-type display device where the electrodes are arranged in a matrix pattern that form individually and selectively addressable pixel-type elements. On the lower substrate 2 there is provided a set of lower electrode elements 6, while on the upper substrate 4 there is provide an upper set of electrode elements 8 which extend orthogonally to the lower electrode elements 6.

Attached to the lower substrate 2 and positioned between the lower electrode elements 6 are a set of post type spacers 10. In the illustrated embodiment of the invention, a post spacer 10 is disposed between every other lower electrode element 6. The post spacers 10 run generally parallel to the lower electrode elements 6 and extend from the lower substrate 2 to the upper alignment layer 12. Thus, in the illustrated embodiment, the post spacers 10 appear as a wall between every other lower electrode element 6. The lower electrode elements 6 are covered with a lower insulating layer 14, upon which a lower alignment layer 16 is disposed. Between the upper electrode elements 8 and the upper alignment layer 12 is disposed an upper insulting layer 20.

According to an important aspect of the present invention, a plurality of resilient adhesive spacers 18 are disposed between the lower alignment layer 16 and the upper alignment layer 12, and are positioned between every other lower electrode element 6 in an alternating manner with the post spacers 10. The adhesive spacers 18 function to absorb mechanical shock which might be imparted to the device from external forces. External forces such as a shock or vibration which might be applied to the substrates and the adjacent layers, will be reduced by the adhesive quality of the adhesive spacers 18, reducing the likehood of damage to the device.

As can be seen, the post spacers 10 and the adhesive spacers 18 define a precise and uniform cell gap g which controls the thickness of the liquid crystal material present between the alignment layers. As previously discussed, maintaining the particular predetermined cell gap g is critical to ensure proper operation of the liquid crystal display device. A defective image will result if the cell gap g is even slightly greater or slightly less than the desired predetermined distance g.

Liquid crystal material 22 is disposed between the alignment layers and is retained substantially in the channels formed by the post spacers 10 and the adhesive spacers 18. As can be seen, in addition to precisely and uniformly maintaining the cell gap g, the post spacers 10 and the adhesive spacers 18 provide additional support for the liquid crystal material 22.

Figure 2:
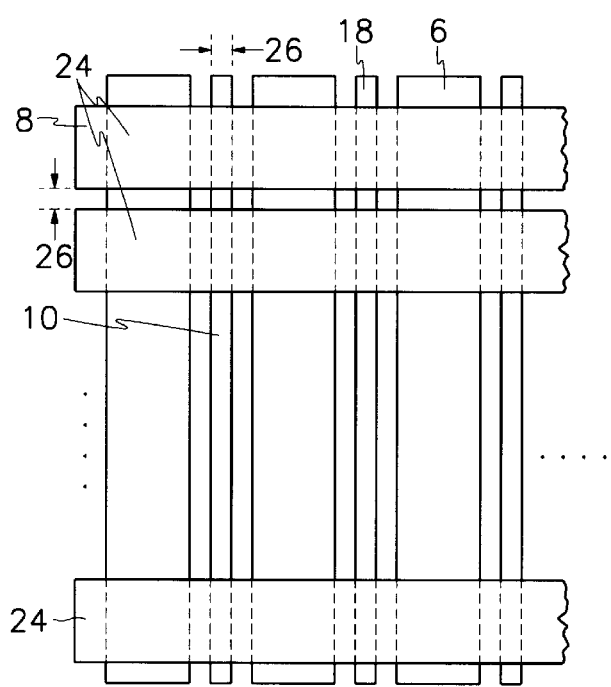
FIG. 2 is a top view of a portion of the liquid crystal display device of FIG. 1.

Turning now to FIG. 2, there is shown a top view of the liquid crystal display device illustrated in FIG. 1, which includes certain elements of the device to show the relationship between active areas of the display and inactive areas of the display. As shown, the lower electrode elements 6 extend orthogonally to the upper electrode elements 8. Active areas 24 of the display are those areas where the upper electrode elements 8 and the lower electrode elements 6 cross, so as to define an area of the liquid crystal material between that can be activated by a difference in the potential between the upper 8 and lower 6 electrode elements. Thus, given the matrix type electrode arrangement of the embodiment illustrated in FIG. 2, the active areas 24 of the display form a matrix of pixels that may be selectively activated by controlling the voltages on the appropriate upper 8 and lower 6 electrode segments. Between the active areas 24 of the display, are the inactive 26 areas of the display. These are defined, in the device with the electrode arrangement illustrated in FIG. 2, as the areas 26 between the upper 8 and lower 6 electrode elements.

According to an important aspect of the present invention, the spacer elements are disposed only in the inactive areas 26 of the display. In other words, the spacer elements are completely disposed between, and run in the same direction as, one of the sets of electrode elements. In the illustrated embodiment, the spacer elements 10 and 18 are disposed between and run in the same direction as the lower electrode elements 6. Thus, the spacer elements 10 and 18 do not interfere with or pose an obstruction in the active areas 24 of the display. The post spacers 10 appear as a wall between every other lower electrode element 6, alternating with the adhesive spacers 18 which are also disposed only between the lower electrode elements 6.

Referring back to FIG. 1, there will be described a preferred technique for fabrication of the liquid crystal display device illustrated. First, the lower electrode pattern 6 is fabricated upon the lower substrate 2, by, for example, a photolithography technique. Next, the conventional post spacers 10 are formed through a spin-coating or photolithography technique. According to an important aspect of the invention, the post spacers 10 are formed only between electrode elements 6 and therefore do not interfere with active areas 24 of the display. According to the illustrated embodiment, post spacers 10 are disposed between every other lower electrode element 6.

After the post spacers 10 are formed, the lower insulating layer 14 is formed over the lower electrode elements 6 and between the post spacers 10. Next, on top of the lower insulating layer 14, there is formed the lower alignment layer 16 which is produced by a spin coating or offset printing type of the technique. Next, upon the lower alignment layer 16, there is formed the adhesive spacers 18 which are positioned between every other pair of lower electrode elements 6, alternately with the post spacers 10.

In separate steps, elements of the upper substrate assembly are fabricated. Upon the upper substrate is formed the upper electrode pattern 8. In the illustrated embodiment, the upper electrodes are formed of a series of longitudinal electrode elements 8 which extend generally orthogonally to the lower electrode elements 6 thereby forming a matrix. Upon the upper electrode elements 8, there is formed an upper insulating layer 20, such as by a spin-coating or photolithography technique. Next, upon the upper insulating layer 20, there is formed an upper alignment layer 12 by, for example, a spin-coating or offset printing technique.

Next, the lower substrate assembly, comprised of the lower substrate 2 upon which the lower electrode elements 6, the post spacers 10, the lower insulating layer 14, the lower alignment layer 16 and the adhesive spacers 18 are formed, is brought together with the upper substrate assembly, comprised of the upper substrate 4 upon which the upper electrode elements 8, the upper insulating layer and the upper alignment layer 12 are formed. After the upper and lower substrate assemblies are placed together, a sealant is applied to the edges of the cell, creating a secure seal of the cell for the liquid crystal material.

According to a preferred embodiment of the invention, spacers will be disposed on the edges of the display cell to provide support and maintain the predetermined cell gap g throughout the entire cell. Since the sealant may have adhesive properties of its own, it is preferable that post type spacers 10 be used for support on the edges. The sealant can be applied adjacent to the post type spacers 10 disposed on the edges of the cell. In another embodiment, the post type spacers 10 may be disposed with spaces between them to provide areas where the sealant may be applied. Next, the cell space is evacuated and then filled by a liquid crystal material 22, according to any of several conventional techniques. As can be seen in FIG. 1, the liquid crystal display material 22 preferably completely fills the spaces between the lower 16 and upper 12 alignment layers and between the post spacers 10 and adhesive spacers 18.

According to a preferred embodiment of the invention, in order to provide greater strength to the post spacers 10, after formation, such as by patterning using polyamide, acryl acid or benzocyclobuten, the spacers 10 are heat-treated at a temperature of between about 200 and 300 degrees Celsius.

The adhesive spacers 18 may be formed of a variety of materials that both provide support, have strong adhesive qualities and have a resilient characteristic that tends to reduce the effects of mechanical shock to the LCD device. According to one embodiment of the invention, the adhesive spacers 18 may be comprised of polytriphenylethane perfluorocyclobutyl ethers benzicyclobutene (Dow Chemical), acryl polymer, photoresist or other suitable material.

Figure 6:
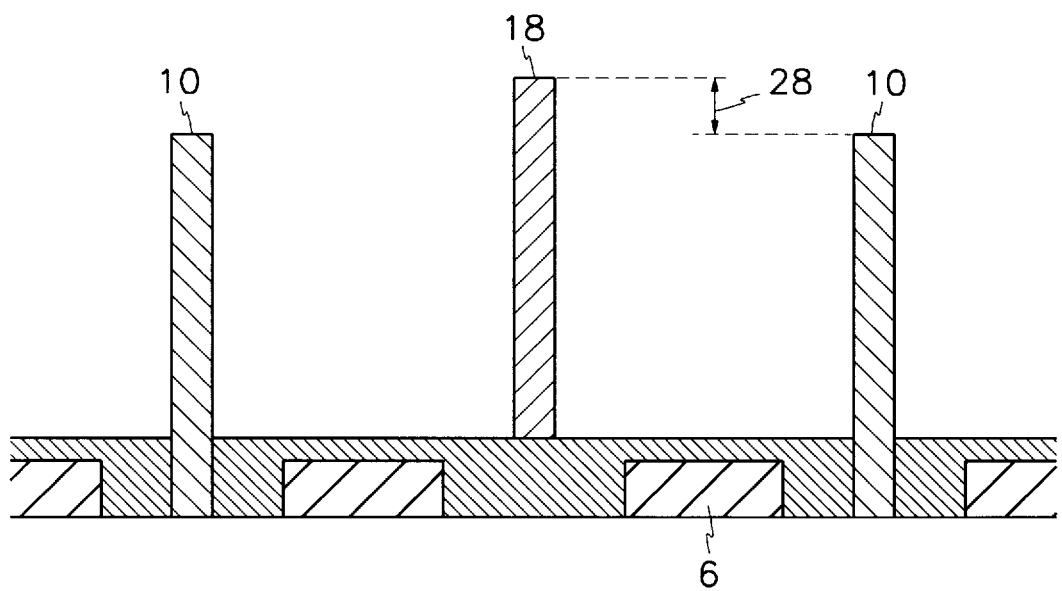
FIG. 6 is a magnified side cross sectional view of the LCD of FIG. 1 prior to assembly and illustrates the difference in height between the post spacers and the adhesive spacers.

Turning now to FIG. 6, there is illustrated a magnified side cross sectional view of the LCD device that shows the relationship between the height of post spacers 10 and the adhesive spacers 18 prior to assembly of the upper substrate assembly and the lower substrate assembly. As can be seen, the adhesive spacers 18 are slightly higher 28 than the post spacers 10. According to one embodiment of the invention, the adhesive spacers 18 may be between about 5 to 50% higher, an preferably about 10 to 30% higher 28 than the post spacers 10, prior to bringing the upper and lower substrate assemblies together. However, when the upper substrate assembly is placed upon the lower substrate assembly, the two assemblies are compressed by using, for example, a pressing device. After the upper and lower substrate assemblies are compressed, they maintain the uniform cell gap g defined by the height of the post spacers 10.

Figure 3:
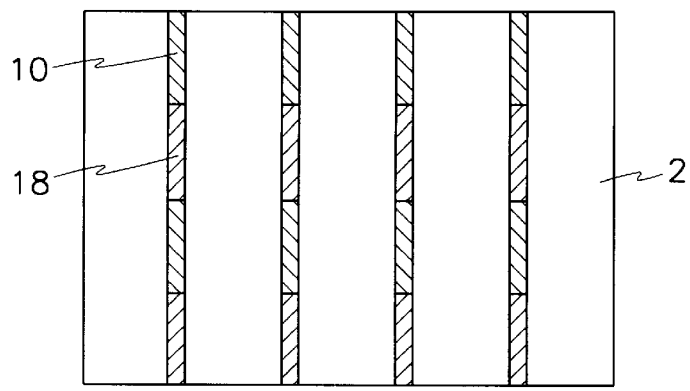
FIG. 3 is a top view depicting an alternative embodiment of the present invention.

FIG. 3 illustrates an alternative embodiment of the invention, where the post spacers 10 and the adhesive spacers 18 are disposed as spacer segments which alternate to form substantially continuous spacer walls.

Figure 4:
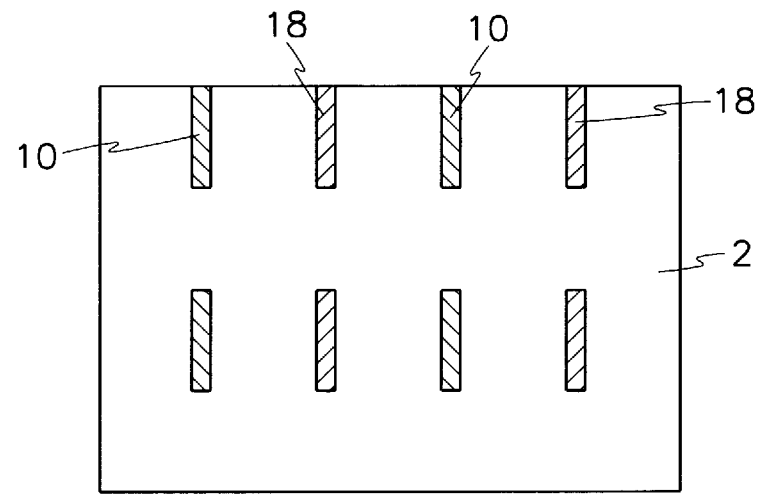
FIG. 4 is a top view depicting another alternative embodiment of the present invention.

FIG. 4 illustrates another alternative embodiment of the invention where the conventional post spacers 10 and the adhesive spacers 18 are separated, rather than continuous, and form spacer segments in a dot-line type pattern rather than a continuous spacer wall. In FIG. 4, the post spacers 10 and the adhesive spacers 18 are generally aligned with each other in adjacent segments in active display areas between lower electrode elements.

Figure 5:
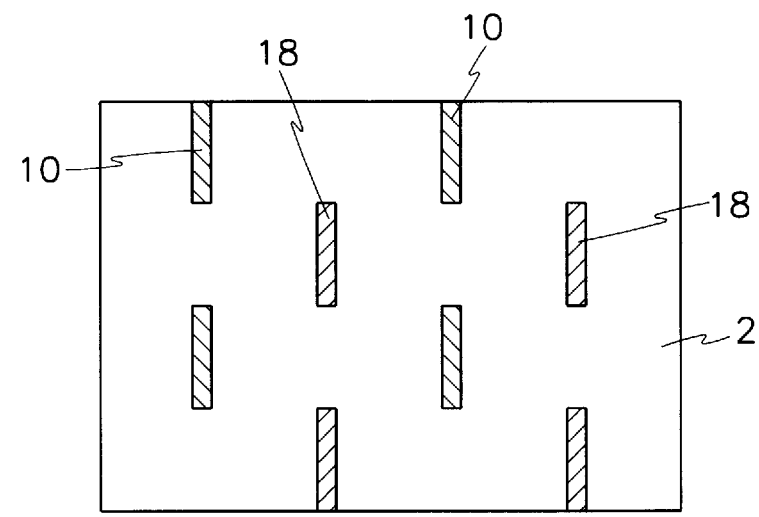
FIG. 5 is a top view depicting yet another alternative embodiment of the present invention.

FIG. 5 illustrates yet another alternative embodiment of the invention which is similar to FIG. 4, but the post spacers 10 and the adhesive spacers 18 are staggered such that they are not disposed in alignment with each other, but are still disposed in a dot-line type pattern.

As should be evident, the particular pattern or placement of the post spacers 10 with respect to the adhesive spacers 18 is shown in FIG. 1 through FIG. 3 only by way of example. In that embodiment, the post spacers 10 and the adhesive spacers 18 are arranged alternating laterally. However, many different alternative arrangements are possible according to the present invention. For example, such another arrangement is illustrated in FIG. 4 where the post spacers 10 and adhesive spacers 18 are arranged alternating longitudinally. In other words, between each lower electrode element 6, there is disposed a spacer wall comprised of alternating segments of a post spacer 10 segment and an adhesive spacer segment 18.

According to yet other alternative embodiment, spacer elements (either post or adhesive spacer elements) might be more sparsely distributed throughout the cell, depending upon the size, structure and intended environment of the LCD device. For example, a post spacer might be disposed in the space between two lower electrode elements, while no spacer is disposed in the adjacent space between the next two lower electrode elements, and then an adhesive spacer might be disposed in the adjacent space between the two next lower electrode elements. As should now be evident, other pattern besides those illustrated may be adopted, but preferably, relatively equal spacing will be preserved in order to precisely maintain a uniform predetermined cell gap.

As can be seen from the foregoing, the liquid crystal display device of the present invention precisely maintains a uniform cell gap by using spacers which are disposed only in inactive display areas. By disposing spacers only in the inactive areas of the display, the present invention prevents a reduction in contrast caused by conventional spacer techniques of the prior art. By using the spacer techniques of the present invention, contrast in an FLCD device may be increased by 4 times, and using spacer walls that include adhesive spacer elements, a strength of over $54 \times 10^3 N/cm^2$ may be achieved.

What is claimed is:

1. A liquid crystal display device comprising:

first and second substrates disposed substantially parallel to each other;

a plurality of transparent electrodes disposed on one side of each of said first and second substrates in a predetermined pattern, wherein said predetermined pattern defines active display areas of the device and inactive display areas of the device;

spacer means for maintaining a substantially uniform predetermined cell gap for liquid crystal material between the first and second substrates, wherein said spacer means is disposed substantially only in the inactive display areas of the device;

first and second insulating layers disposed respectively on the first and second substrates to cover the transparent electrodes;

first and second alignment layers disposed respectively on the first and second insulating layers; and shock absorbing means for absorbing shock forces between the first and second substrates, said shock absorbing means being disposed substantially only in the inactive display areas of the device;

wherein said spacer means extends substantially from the first substrate to said second alignment layer, and said shock absorbing means comprises an end spaced away from the first substrate and extending substantially from the first alignment layer to the second alignment layer.

2. The liquid crystal display device of claim 1 wherein said spacer means comprises a plurality of spacer elements each extending from said first substrate to said second alignment layer in the inactive display areas.

3. The liquid crystal display device of claim 2 wherein said spacer elements are disposed in a dot-line pattern.

4. The liquid crystal display device of claim 2 wherein said spacer elements are disposed in a substantially continuous strip pattern.

5. The liquid crystal display device of claim 1 wherein said shock absorbing means comprises a plurality of adhesive spacer elements disposed substantially only in the inactive display areas of the device.

6. The liquid crystal display device of claim 1 wherein said shock absorbing means comprises at least one adhesive spacer element disposed between the first and second alignment layers in a strip pattern which extends substantially only in the inactive display areas of the device.

7. The liquid crystal display device of claim 2 wherein said spacer elements are heat treated.

8. The liquid crystal display device of claim 1 wherein said spacer means comprises a material selected from the group consisting of polyamide, BCB, and Acryl polymer, and said spacer means is fabricated using a photolithography technique.

9. The liquid crystal display device of claim 1 wherein the shock absorbing means comprises a material selected from the group consisting of photoresist, acrylpolymer or polytriphenylethane perfluoroclobutyl ethers benzocyclobutene.

10. A liquid crystal display device comprising:

first and second substantially planar substrates disposed substantially parallel to each other;

a plurality of transparent electrodes disposed on one side of each of the first and second substrates in a predetermined pattern, said predetermined pattern defining active display areas of the device and inactive display areas of the device;

a rigid spacer for maintaining a substantially uniform cell gap between the first and second substrates;

a resilient spacer for absorbing shock forces between the first and second substrates;

wherein said rigid and resilient spacers are disposed substantially only in the inactive display areas of the device;

first and second insulating layers disposed respectively on the first and second substrates to cover the transparent electrodes; and first and second alignment layers disposed respectively on the first and second insulating layers;

wherein said rigid spacer extends substantially from the first substrate to said second alignment layer, and said resilient spacer comprises an end spaced away from the first substrate and extending substantially from the first alignment layer to the second alignment layer.

11. The liquid crystal display device of claim 10 wherein said resilient spacer comprises adhesive characteristics.

12. The liquid crystal display device of claim 10 wherein said resilient spacer comprises a material selected from the group consisting of photoresist, acrylpolymer and polytriphenylethane perfluoroclobutyl ethers benzocyclobutene.

13. The liquid crystal display of claim 10 wherein said rigid spacer comprises a material selected from the group consisting of polyamide, BCB, and acrylpolymer.

* * * * *

UNITED STATES PATENT AND TRADEMARK OFFICE
CERTIFICATE OF CORRECTION

PATENT NO. : 5,838,414
DATED : November 17, 1998
INVENTOR(S) : Sangrok Lee

It is certified that error appears in the above-identified patent and that said Letters Patent is hereby corrected as shown below:

Column 1, line 40, after "cell cap" delete "is".
Column 1, line 45, after "resulting" insert -- in --.
Column 2, line 3, replace "includes" with -- include --.
Column 3, line 64, replace "provide" with -- provided --.
Column 4, line 50, before "that can be" delete "between".
Column 6, line 20, before "preferably" replace "an" with -- and --.
Column 6, line 60, replace "other" with -- another --.
Column 7, line 3, replace "pattern" with -- patterns --.
Column 8, line 14, replace "Acryl polymer" with -- acrylpolymer --.
Column 8, line 20, replace "perfluoroclobutyl" with
    -- perfluorocyclobutyl --.
Column 8, line 51, replace "perfluoroclobutyl" with
    -- perfluorocyclobutyl --.

Signed and Sealed this

Fifth Day of December, 2000

Attest:

Q. TODD DICKINSON

*Attesting Officer*  *Director of Patents and Trademarks*